T. ERICKSON.
SLEEVE PULLER.
APPLICATION FILED MAY 6, 1920. RENEWED JUNE 16, 1921.
1,403,754.
Patented Jan. 17, 1922.
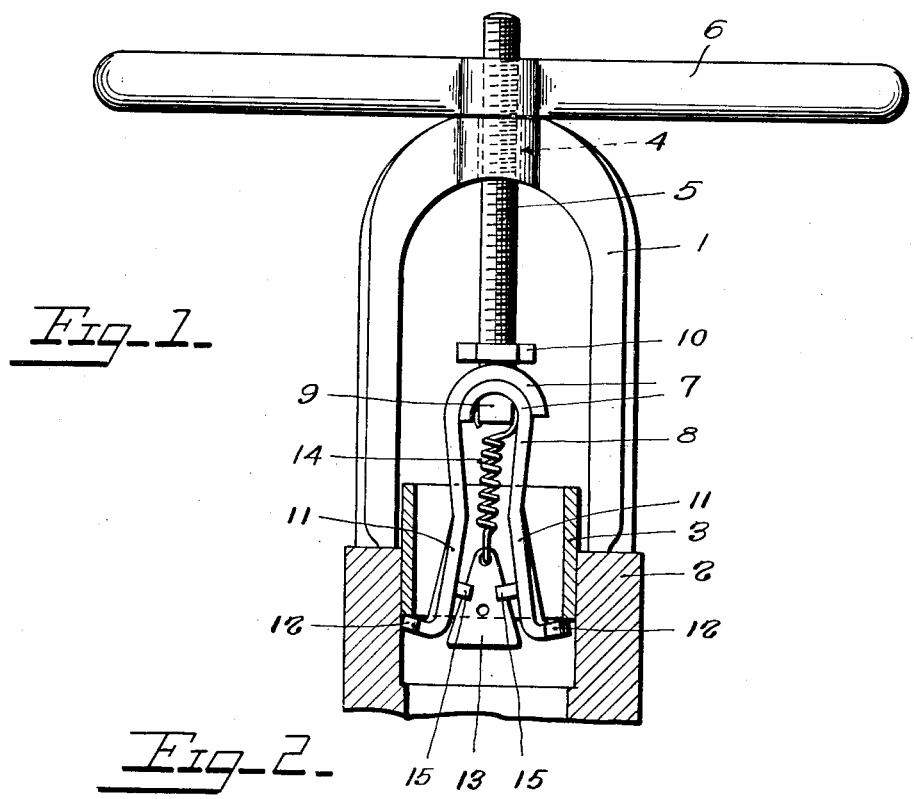
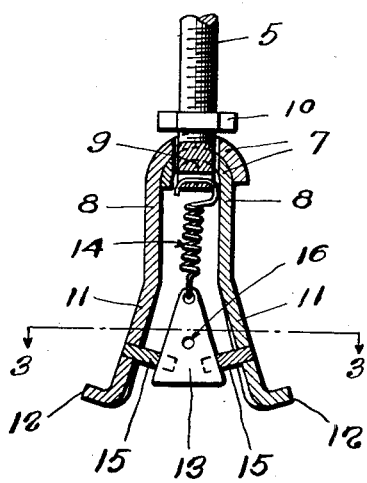
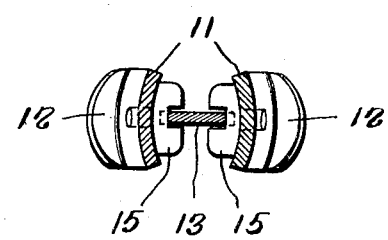
Witness
Evans D. Haines.
Inventor
Theodore Erickson.
By H. B. Willson & Co.
Attorneys

UNITED STATES PATENT OFFICE.

THEODORE ERICKSON, OF CHARLEVOIX, MICHIGAN.

SLEEVE PULLER.

1,403,754.     Specification of Letters Patent.     Patented Jan. 17, 1922.

Application filed May 6, 1920. Serial No. 379,380. Renewed June 16, 1921. Serial No. 478,214.

*To all whom it may concern:*

Be it known that I, THEODORE ERICKSON, a citizen of the United States, residing at Charlevoix, in the county of Charlevoix and State of Michigan, have invented certain new and useful Improvements in Sleeve Pullers; and I do declare the following to be a full, clear, and exact description of the invention, such as will enable others skilled in the art to which it appertains to make and use the same.

This invention relates to an improved sleeve puller and is used for removing bushings and other similar sleeves from hubs and other articles in which the sleeves are placed.

One object of the invention is to provide a sleeve puller so constructed that the sleeve engaging jaws may be passed through the sleeve or bushing from the outer end thereof and after passing the inner end of the sleeve may be expanded or forced apart for engaging the inner end of the sleeve and drawing the sleeve outwardly.

Another object of the invention is to provide an improved cam or wedge which serves to expand the jaws and to so mount this wedge that it will be drawn inwardly for engaging the abutment fingers of the jaws.

Another object of the invention is to so mount the jaws that they may have the necessary pivotal movement but further so mount them that they cannot move out of proper engagement with the drawing stem or out of proper engagement with each other.

Another object of the invention is to so construct this device that it may be very easily put in place and the ring gripping jaws extended through the sleeve with the cam wedge in engagement with the abutment fingers of the jaws.

This invention is illustrated in the accompanying drawings wherein:

Figure 1 is a view showing the improved sleeve puller in elevation and operatively associated with a sleeve to be extracted.

Fig. 2 is a fragmentary view showing the sleeve engaging jaws in longitudinal section.

Fig. 3 is a transverse sectional view taken along the line 3—3 of Fig. 2.

This sleeve puller is provided with a yoke or bridge 1 which is to engage the end of a tube 2 in which the sleeve or bushing 3 is mounted. This yoke is provided with an unthreaded bearing 4 through which extends the threaded pulling rod 5 having an actuating handle 6 threaded upon it above the yoke. This pulling stem 5 is passed through elongated openings formed in the curved heads 7 of the sleeve engaging jaws 8 and the stem is provided at its lower end with an enlarged head 9 upon which the heads of the jaws rest. A securing nut 10 is mounted upon this stem for engaging the upper head 7 and preventing the two jaws from having movement longitudinally upon the stem. These sleeve engaging jaws have their end portions 11 extending in diverging relation and have their ends bent outwardly to provide fingers 12 for engaging the inner end of the sleeves. In order to move the jaws apart there has been provided a wedge 13 which tapers upwardly and has its upper end connected with a spring 14 carried by the head 9 of the pulling stem or rod 5. It will thus be seen that when the wedge is in the position shown in Figs. 1 and 2 with its converging side edges fitting into the notches of the abutment fingers 15 of the jaws the wedge will serve to move the jaws apart.

When this sleeve puller is in use, the two jaws will be grasped and pressed towards each other thus moving the wedge to stretch the spring. The hooked end portions of the jaws will then be passed into the sleeve or bushing 3 and will be forced through the sleeve. As soon as the hooks or fingers 12 pass beyond the inner end of the sleeve the wedge will be drawn towards the head of the rod 5 and this will cause the jaws to be spread apart so that the hooks or fingers will engage the inner wall of the tube 2. If when putting this device in place it is found difficult to force the jaws towards each other with the wedge in place a hook may be passed through the opening 16 and the wedge forced towards the free ends of the jaws. The yoke can now be slid upon the stem so that the ends of its arms will engage the end of the tub and the handle rotated upon the stem. This will bring the handle into engagement with the end of the yoke at the bearing 4 and continued rotation will cause the stem to be drawn outwardly. The jaws will be drawn outwardly with the stem and since the hooks engage the sleeve, the sleeve or bushing will be drawn out of the tub. These sleeve engaging jaws 8 are therefore so constructed that they may be very easily used in connection with sleeves or bushings of different diameters and are further so constructed that when passed through the sleeve they will move of themselves to the necessary position for engaging the inner end of the sleeve.

What is claimed is:

1. A sleeve puller comprising a yoke having a bearing, a threaded draw rod slidably passing through the bearing and provided with an enlarged head at its inner end, a handle member threaded upon the stem for engaging the outer end of the bearing, sleeve engaging jaws loosely mounted upon the stem, a securing nut screwed upon the stem for holding the jaws between the nut and head, a spring connected with the head and extending between the upper end portions of the jaws, and a cam carried by the spring for engaging the jaws and moving the jaws apart.

2. A sleeve puller comprising a yoke having a bearing, a draw stem extending through the bearing, a handle threaded upon the stem and engaging the bearing, ring engaging jaws loosely mounted upon the inner end portion of the stem, a cam for engaging the jaws to spread the same apart for engaging a sleeve, and a spring connecting the cam with the inner end of the stem to draw the cam towards the stem between the jaws.

3. A sleeve puller comprising a yoke, a carrier slidably connected with said yoke, means for drawing the carrier outwardly, sleeve engaging jaws loosely connected with the inner end portion of the carrier, a cam element positioned between the jaws, and resilient means connecting the cam element with the inner end portion of the carrier for drawing the cam elements towards the carrier in engagement with the jaws and spreading the jaws.

4. A sleeve puller comprising a yoke, a carrier slidably carried by the yoke, means for moving the carrier outwardly, sleeve engaging jaws movably connected with the carrier, abutment fingers carried by the jaws, a spring element connected with the carrier and extending between the jaws, and a cam connected with the spring element for engaging the abutment fingers and moving the jaws apart when drawn towards the carrier by the spring element.

5. A sleeve puller comprising a yoke, a carrier connected with the yoke for movement longitudinally thereof, means for imparting movement to the carrier, jaws rotatable and pivotally connected with the carrier, a cam element for imparting movement to the jaws and resilient means connecting the cam element with the carrier.

6. A sleeve puller comprising a yoke, a draw stem carried by the yoke, means for moving the draw stem longitudinally, sleeve engaging jaws having their upper end portions curved and overlapped and provided with registering openings receiving the stem, the free end portions of the jaws being bent to provide sleeve engaging fingers, abutment fingers carried by the jaws and having notches, a cam positioned between the jaws for fitting into the notches of the abutment fingers, and resilient means for connecting the cam with the stem.

7. A sleeve puller comprising a yoke, a carrier adjustably associated with the yoke, sleeve engaging elements carried by the carrier, a cam element for engaging the sleeve engaging elements and moving the same to an operative position, and resilient means connecting the cam element with the carrier.

8. A sleeve puller including movably mounted sleeve engaging elements, a cam element for moving the sleeve engaging elements to an operative position, and resilient means engaging the cam element for imparting movement to the same.

In testimony whereof I have hereunto set my hand.

THEODORE ERICKSON.